United States Patent [19]
Pantzar et al.

[11] Patent Number: 5,810,521
[45] Date of Patent: Sep. 22, 1998

[54] CUTTING INSERT WITH TWISTED CHIP SURFACE

[75] Inventors: Göran Pantzar, Arsunda; Per Nilsson; Magnus Aspeby, both of Sandviken, all of Sweden

[73] Assignee: Sandvik AB, Sandviken, Sweden

[21] Appl. No.: 772,472

[22] Filed: Dec. 23, 1996

Related U.S. Application Data

[63] Continuation of Ser. No. 441,653, May 15, 1995, abandoned, which is a continuation of Ser. No. 185,144, Jan. 24, 1994, abandoned.

[30] Foreign Application Priority Data

Jan. 27, 1993 [SE] Sweden .................................. 9300235

[51] Int. Cl.$^6$ ...................................................... B23C 5/20
[52] U.S. Cl. ............................ 407/114; 407/115; 407/116
[58] Field of Search ...................................... 407/114, 113, 407/115, 116, 34, 47, 42

[56] References Cited

U.S. PATENT DOCUMENTS

| | | | |
|---|---|---|---|
| 4,318,645 | 3/1982 | McCreery | 407/116 X |
| 4,940,369 | 7/1990 | Aebi et al. | 407/42 |
| 5,199,827 | 4/1993 | Pantzar | 407/114 X |
| 5,388,932 | 2/1995 | DeRoche et al. | 407/113 |
| 5,544,984 | 8/1996 | Pantzar | 407/113 |

FOREIGN PATENT DOCUMENTS 000392730  10/1990  European Pat. Off. ............... 407/113

*Primary Examiner*—A. L. Pitts
*Assistant Examiner*—Henry W. H. Tsai
*Attorney, Agent, or Firm*—Burns, Doane, Swecker & Mathis, L.L.P.

[57] ABSTRACT

An indexable cutting insert comprises an upper surface, a bottom surface and side surface extending between said two surfaces. Between two adjacent cutting corners, a rake surfaces is formed such that the rake angle decreases with increasing cutting depth. In this way the cutting edge is reinforced towards a maximal cutting depth. This configuration is favorable, for example, at the machining of materials with a tendency of surface hardening.

11 Claims, 2 Drawing Sheets

CUTTING INSERT WITH TWISTED CHIP SURFACE

This application is a Continuation of application Ser. No. 08/441,653, filed May 15, 1995, now abandoned, which, in turn, is a continuation of applicaiton Ser. No. 09/185,144 filed Jan. 24, 1994, now abandoned.

BACKGROUND AND SUMMARY OF THE PRESENT INVENTION

The present invention relates to a cutting insert for chip forming machining tools, in particular milling cutters, such as face millers. The cutting inserts are preferably produced by form pressing and sintering of an insert forming powder. The cutting insert comprises an upper chip surface, a lower planar bottom surface which is adapted to be placed into abutment with a cooperating bottom support surface of the machining tool, and at least three side surfaces extending between the upper and bottom surfaces. At least one of the side surfaces adjoins the upper chip surface along a line that constitutes a cutting edge.

Such inserts are more and more produced by a direct pressing method during which a cemented carbide powder is first shaped into desired form in a suitable pressing tool and then is given final strength by sintering in an oven at temperatures above 1000° C. The pressing operation has been sophisticated over the years and is nowadays so well defined that the process provides good possibilities of forming the cutting edge and adjacent chip forming surfaces and possible reinforcing chamfers and clearance surfaces with great exactitude. Moreover, shrinkage following the forming process is taken into account when dimensioning the pressing tool.

Today's cutting geometries tend to be more and more positive, i.e., larger and larger angles between the chip or rake surface of the insert and a normal to the machined surface. The reason for this geometry is that several advantages are obtained thereby, such as a small cutting force and thus a low energy consumption, a well defined cutting edge for high measure precision, and a wider liberty when selecting a relief angle while maintaining a positive cutting geometry. The disadvantage is that the cutting edge becomes sharper and thus weaker, which can cause chipping in the cutting edge. The cutting edge angles are often very small and approach the strength limits of the cemented carbide.

Often the low-energy positive cutting geometries are used for machining materials which are marred with special negative properties. Hence, some materials, like some tougher and harder materials with a tendency of surface hardening, for instance, some stainless steels and phosphorus containing steels, have a disposition to self-hardening during cutting and/or machining. In particular, at the cut edge generated by the machining at maximal cutting depths, the property of self-hardening of the workpiece appears. The reason why self-hardening mainly occurs at larger cutting depths is that the cutting forces and the produced heat then increase, at the same time as the machining generates sharp burrs at the surface of the workpiece. The burrs generated by the process are immediately hardened by the air cooling, which produces increased stress on the cutting edge, and in particular on the part of the cutting edge that corresponds to the maximal cutting depth. This increased stress caused by the hardened burrs occasionally brings about chipping and breakage in the cutting edge. The risk of such defects increases with increasing cutting depth.

An object of the present invention is to minimize, or even eliminate, the risk of chipping and breakage at a level of the cutting edge that corresponds to the maximal cutting depth.

This object and others are accomplished by forming the cutting edge with increasing strength towards the direction of increasing cutting depth, which is realized by gradually decreasing the rake angle towards the direction of increasing cutting depth. In accordance with the present invention, this result is accomplished by providing a helically twisted rake surface along the cutting edge.

In accordance with the present invention, the relief angle of the insert is preferably held constant. Alternatively, the relief angle can be slightly twisted, however not to the same degree as the rake surface. The angle of the relief surface should not have the same degree of helical twist as the rake surface, since in that case, the strength of the cutting edge would not increase with increasing cutting depth, which is an important feature of the present invention. If the relief surface is also helically twisted, its pitch, as presently preferred, should be no more than half as large as the pitch of the rake surface.

Indexable cutting inserts with helically twisted rake or chip surfaces, per se, along their cutting edges are previously known. See for instance EP-A-239 045 and EP-A-392 730. However, these cutting inserts have equally twisted rake and relief surfaces in order to keep the cutting edge angle constant. However, by this prior configuration, these known inserts fail to produce the desired effect of the present invention, since the cutting edge is not gradually reinforced in the direction of an increasing cutting depth and the risk for chipping and breakage at the level of maximal cutting depth remains.

BRIEF DESCRIPTION OF THE DRAWING FIGURES

For illustrative but non-limiting purposes, a preferred embodiment of the invention will now be described in more detail with reference to the appended drawings, wherein like members bear like reference numerals, and wherein.

DETAILED DESCRIPTION OF THE PREFERRED EMBODIMENT

Figure 1:
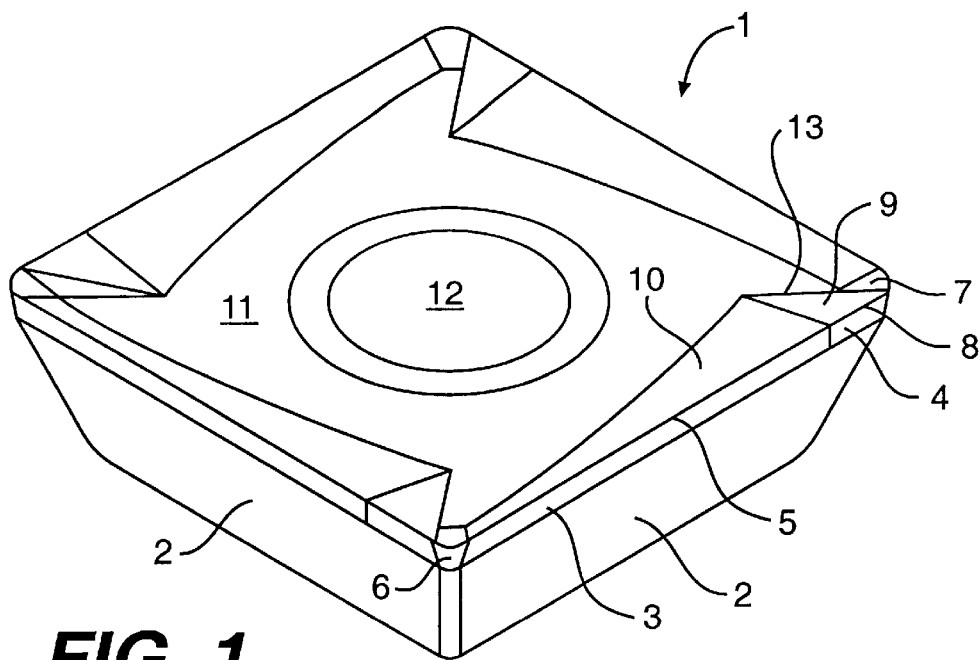
FIG. 1 is a perspective view of the insert according to the present invention.
Figure 2:
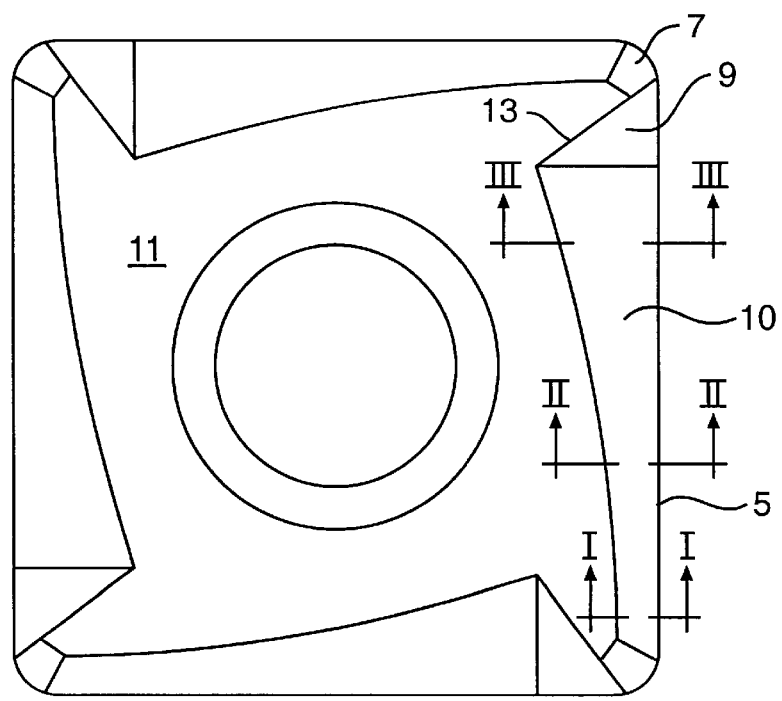
FIG. 2 is a top view of the insert according to the present invention.

FIGS. 1 and 2 illustrate an indexable cutting insert 1 of square basic form, according to the invention. The insert comprises a substantially planar upper surface or chip surface 11 and a bottom surface which is parallel with the upper surface 11, and relief or side surfaces 2 and 3. Side surface 2 forms an acute angle with the surface 11. The side surfaces according to FIG. 1 are composed of the planar surfaces 2 and 3, which form an obtuse angle with each other along a break or intersection line. At the secondary cutting edge 8, the relief surface 3 intersects with the relief surface or planar face 4. A secondary rake surface 9 is provided adjacent the secondary cutting edge 8. However, the relief or clearance geometry is not an essential feature of the present invention and can also be made up of one sole plane or a slightly curved relief surface which occupies the entire side surface. Moreover, at least the side surface adjoining the cutting edge may be perpendicular to the planar upper surface 11.

Figure 3A:
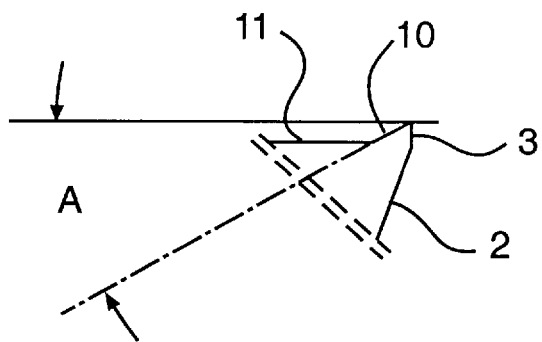
FIGS. 3a, 3b and 3c are cross-sectional views along lines I—I, II—II and III—III, respectively in FIG. 2.
Figure 3B:
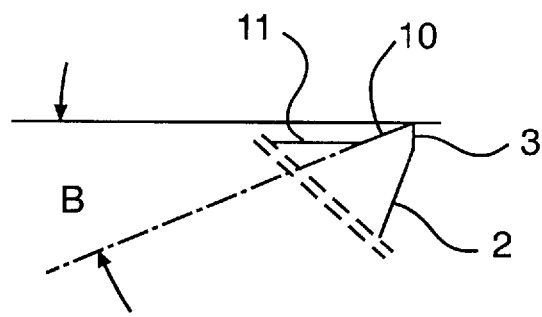
Figure 3C:
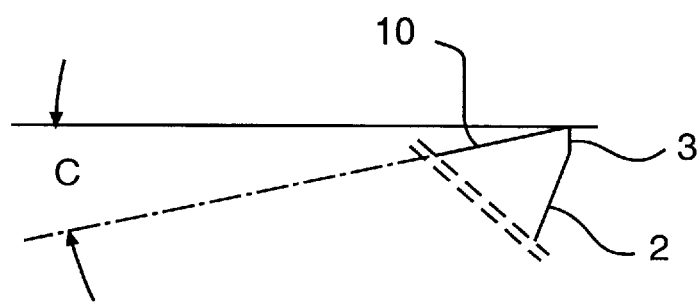

As can be seen in FIGS. 1 and 2, a rake surface 10 extends between two adjacent cutting corners 6. The rake surface 10 is shaped in the manner that is characteristic for the present invention. Thus, the rake surface 10 starts off with its largest rake angle "A" adjacent to an operative cutting corner, suitably between 15° and 40°, and preferably between 20° and 30° (FIG. 3a). Thereafer, the rake angle decreases gradually along the main cutting edge 5, to rake angle "B" (FIG. 3b), and then to finally reach its smallest value rake angle "C" adjacent to the rake surface 9, suitably from 5° to 25°, preferably from 10° to 20° (see FIG. 3c). The secondary rake surface 9 is terminated by a substantially vertical surface 13, which can also function as a chip breaker. The transition between the surface 13 and the rake surface 10 associated with the next cutting edge is made over a transition surface 7, which also functions as rake surface for the corner cutting edge.

The rake surface 10 is gradually and continuously helically twisted in order to gradually reinforce the main cutting edge 5 at increasing cutting depths. By this configuration, indexable cutting inserts are possible with surprisingly long lives at the machining of tough materials which have a tendency of surface hardening. The magnitude of the rake angle at different levels of the cutting edge, and the degree of helical twist, can be seen in FIGS. 3a, 3b and 3c.

The configuration of the upper surface 11 inside the rake surfaces 10 is not an essential feature of the present invention. Thus, this surface can be provided with suitable chip breaking geometries known, per se, such as ridges, bumps, dimples, etc.

Preferably, the cutting insert according to the invention is provided with a central through-hole 12 for the insertion of a suitable clamping device, such as a screw, a locking pin, etc.

According to the illustrated embodiment, the main cutting edge is completely straight. However, it can also be slightly curved outward, in order to compensate for the positive, or exceptionally negative, inclination of the insert in the milling cutter body, thus ensuring full planarity of the obtained surface on the workpiece.

The principles, preferred embodiment and mode of operation of the present invention have been described in the foregoing specification. However, the invention which is intended to be protected is not limited to the particular embodiments disclosed. Variations and changes that fall within the spirit and scope of the appended claims are intended to be embraced thereby.

What is claimed is:

1. A milling cutting insert for chip forming machining tools, comprising an upper surface, a lower bottom surface adapted to be placed into abutment with a cooperating support surface of the machining tool, and at least one face disposed between said upper surface and said lower bottom surface, said at least one face including at least three side surfaces being defined between two adjacent operative cutting corners, a rake surface forming an obtuse angle with said upper surface, a first side surface adjoining the rake surface and forming an acute wedge angle along a line that constitutes a main cutting edge, said first side surface being substantially planar, a second side surface adjoining the rake surface at a second acute angle along a line that constitutes a secondary cutting edge disposed adjacent said main cutting edge and being non-collinear therewith, a third planar side surface extending between the two adjacent corners, the first and second side surfaces adjoining the third planar side surface at an obtuse angle along an intersection line, the rake surface adjacent to and extending along the main cutting edge being helically twisted along its length such that a rake angle of the rake surface is largest adjacent to a first operative cutting corner and smallest adjacent the secondary cutting edge, the wedge angle increasing with increasing cutting depth, wherein a relief angle of each of the first and second side surfaces of the insert is substantially constant to thereby gradually reinforce the main cutting edge at increasing cutting depths.

2. The insert according to claim 1, wherein the helically twisted rake surface has a rake angle of between 15° and 40° next to the first operative cutting corner, and a rake angle of between 5° and 25° adjacent the secondary cutting edge.

3. The insert according to claim 1, wherein each side surface includes at least one planar surface which forms a perpendicular angle with the upper surface.

4. The insert according to claim 1, wherein the relief angle of at least one of the side surfaces adjoining the main cutting edge is between 0° and 12°.

5. The insert according to claim 1, wherein at least one of said side surfaces forms an acute angle with the upper surface.

6. The insert according to claim 2, wherein the helically twisted surface has a rake angle next to the first operative cutting corner of between 20° and 30°.

7. The insert according to claim 2, wherein the helically twisted surface has a rake angle adjacent the secondary cutting edge of between 10° and 20°.

8. The insert according to claim 1, wherein the insert is produced by form-pressing and sintering of a powder of insert-forming material.

9. The insert according to claim 1, wherein at least one of said side surfaces has a helically twisted relief surface.

10. The insert according to claim 1, wherein the relief angle of at least one of said first and second side surfaces is less than one-half of the rake angle of the rake surface.

11. A milling cutting insert comprising:

an upper surface;

a lower surface adapted to be placed into abutment with a cooperating support surface of a machining tool;

first and second operative cutting corners;

a rake surface forming an obtuse angle with said upper surface, said rake surface adjacent to and extending along a main cutting edge, said rake surface being helically twisted along its length such that a rake angle of the rake surface is largest adjacent the first operative cutting corner; and at least one face disposed between said upper and lower surfaces, said face including a first, second, and third planar side surface extending between the first and second operative cutting corners, said first side surface adjoining the rake surface at an acute cutting angle along a line that constitutes the main cutting edge, said first side surface being substantially planar, said second side surface adjoining the rake surface at a second acute angle along a line that constitutes a secondary cutting edge disposed adjacent said main cutting edge, the main cutting edge and the secondary cutting edge being non-collinear, and said third planar side surface extending between the two adjacent corners, the first and second side surfaces adjoining said third planar side surface at an obtuse angle along an intersection line.

\* \* \* \* \*